A. WOLF.
BEDSTEAD CORNER FASTENING
APPLICATION FILED FEB. 26, 1914.

1,098,869.

Patented June 2, 1914.

WITNESSES:

INVENTOR
Aaron Wolf
BY
ATTORNEY

# UNITED STATES PATENT OFFICE.

AARON WOLF, OF NEW YORK, N. Y.

BEDSTEAD CORNER-FASTENING.

1,098,869.  Specification of Letters Patent.  Patented June 2, 1914.

Application filed February 26, 1914. Serial No. 821,110.

*To all whom it may concern:*

Be it known that I, AARON WOLF, a citizen of the United States, and resident of New York city, in the county of New York and State of New York, have invented certain new and useful Improvements in Bedstead Corner-Fastenings, of which the following is a specification.

This invention relates to certain improvements in fastening devices for securing one member to the side of a tubular member. Such devices are commonly employed as the corner post fastenings of bedsteads and my device is particularly adapted for such use, although it may be employed in other kinds of furniture, such for instance as chairs or cots and may be employed in other structures than furniture where it is desired to detachably secure two members together.

One object of my invention is to simplify the fastening means and this I accomplish by using a single stud projecting outwardly from the interior of the post and through abutting elements of the post and side rail. Two separate concentric nuts may be employed, one for holding the abutting element of the post in position, and the other for holding the two abutting elements together.

My invention involves certain important structural features, which will be more particularly described hereinafter, and pointed out in the claims.

Figure 1:
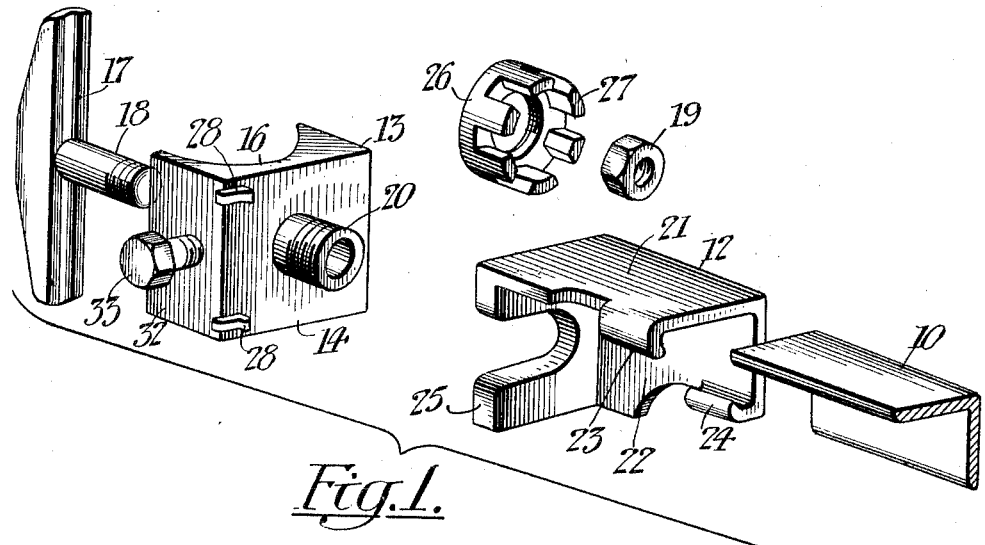
Figure 2:
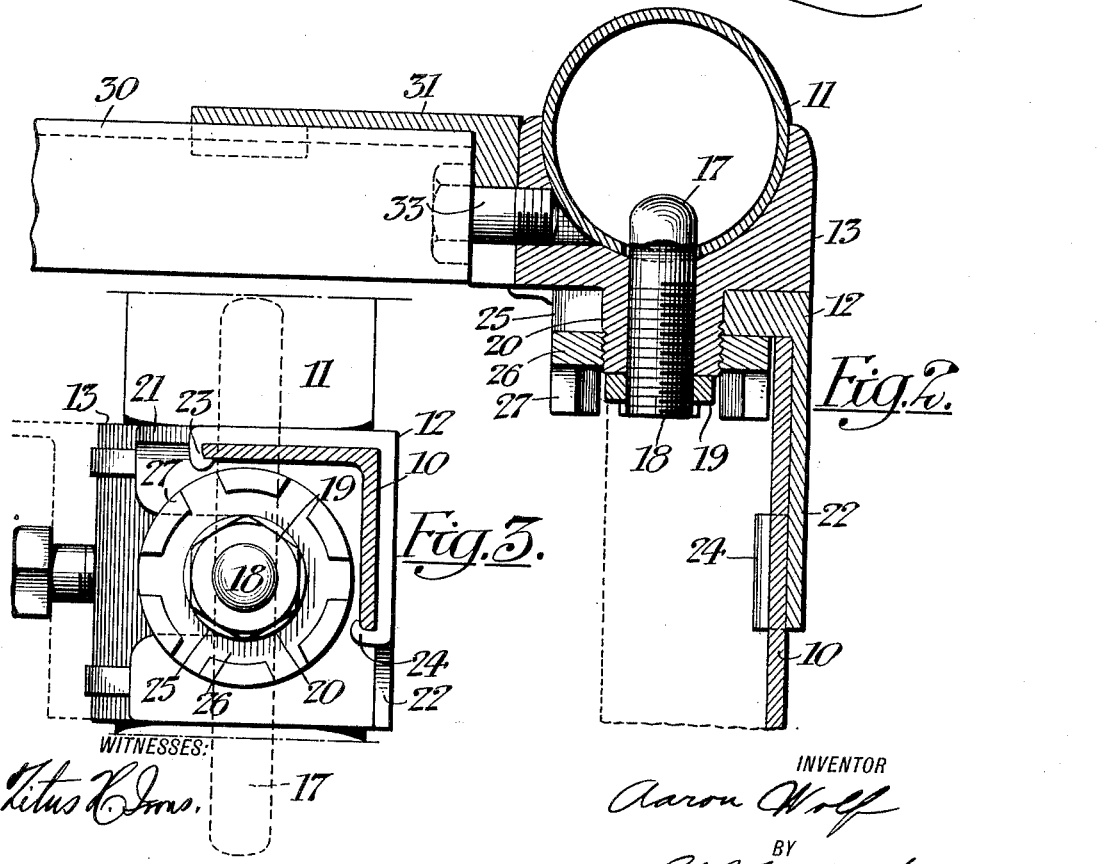
Figure 3:
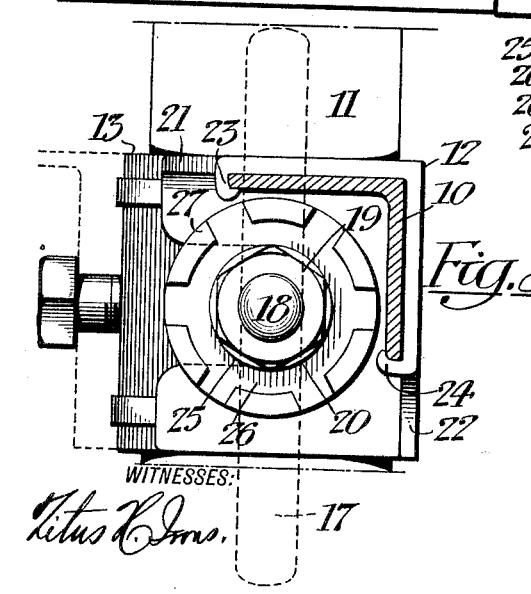

Reference is to be had to the accompanying drawings in which similar characters of reference indicate corresponding parts throughout the several views, and in which:

Figure 1 is a perspective view of the several detached parts of a corner fastening embodying my invention; Fig. 2 is a horizontal section; and Fig. 3 is a side elevation, the side rail being shown in section.

The specific form illustrated in the accompanying drawings is shown in connection with a rail 10 and a tubular post 11 which may be the side rail and corner post of a metallic bedstead. The construction illustrated includes the detachably connected members 12 and 13, the former rigid with or forming a part of the side rail, and the other secured to and rigid with the corner post. The member 13 is preferably in the form of a cast metal block presenting a substantially flat outer face and an inner face 16 adapted to engage with the outer surface of the post. If the post be cylindrical, this face 16 will be concave and cylindrical, as shown, and if the post be square or of other form in cross-section, the surface 16 of the block 13 will be correspondingly formed.

For securing the member 13 to the post I preferably provide a member 17 in the form of a bar, plate or block adapted to be placed within the post and having a threaded stud or pin 18 thereon adapted to extend outwardly through an aperture in the wall of the post and through a corresponding aperture in the member 13. A suitable nut 19 is provided for threaded engagement with the outer end of the stud or pin 18 so that upon tightening the nut the members 13 and 17 may be held rigidly in respect to each other and effectively clamp a portion of the wall of the post therebetween, so that the member 13 will be rigid with the post. The nut 19 when tightened engages with the member 13 although it is not essential that it engage directly with the flat face 14. It may engage directly with this face, but in the specific form illustrated, I provide the member 13 with a cylindrical boss or collar 20, integral therewith and projecting out from the face 14 and concentric with the aperture through which the stud or pin 18 extends. In this construction the stud or pin is made of such length as to extend to a slight distance beyond the end of the boss or collar 20 so that the nut upon being tightened will engage with the outer end of the latter.

The member 12 which is secured to the side rail 10 is of a cross sectional form corresponding to that of the side rail. As shown the side rail is in the form of an angle iron and the member 12 has a top horizontal wall 21 and a vertical side wall 22. These walls engage with the two flanges of the angle iron side rail and are rigidly and permanently secured to the latter. The securing may be effected by rivets, bolts or in any other suitable manner, but as shown, I provide the free edges of the walls 21 and 22 with flanges 23 and 24, which may be bent around the free edges of the flanges of the angle iron so as to lock the parts together. The member 12 has an end wall 25 presenting a substantially flat face adapted to engage with the flat face 14 of the member 13. This end wall is provided with an opening through which the stud 18 and the boss 20 may project. The opening is preferably in the form of a slot extending inwardly from one side edge of said end wall, so as to form two separate branches and adapted to lie upon opposite sides of the boss 20 and against the flat surface 14. For securing the member 12 to the member 13, I provide a nut 26 adapted to screw on to either the pin 18 or the boss 20. The nut engages with the inner surface of the end wall 25 and when tightened binds said end wall firmly against the surface 14. To facilitate the turning of the nut and to avoid the necessity of employing a wrench the nut is preferably made circular with a flange 27 on one end face, sub-divided into sections so as to permit the insertion of a screw driver or any other suitable tool through the insertions between flange sections to rotate the nut. By means of this construction it will be noted that the side rail may be detached from the corner post by slightly loosening the nut 26 and sliding the member 12 laterally. Furthermore, the removal of the side rail does not in any way affect the clamping of the block 13 to the corner post. The side rail is shown as having its horizontal flange projecting laterally from the upper edge of the side flange as is the common arrangement in bedsteads where a separate set of metal springs is employed. It is of course evident that the side rail may be turned end for end and rotated so that the horizontal flange of the side rail will project inwardly from the lower edge of the said flange and serve as a support for the frame of the springs or for transverse bed-slats. The portion of the boss 20 adjacent to the surface of the member 13 may be made flat on the upper and lower sides, so as to engage with the edges of the slot in the end wall 25, and prevent the side rail from rotating about the boss as an axis, but preferably the member 13 is provided with two very small lugs 28, which will engage with one edge of the end wall 25 and prevent the latter from rotating in its own plane.

I have shown the member 13 provided with a boss or collar 20 upon which the nut 26 may be screwed, but it is of course evident that this boss may be entirely omitted, and the nut 19 screwed on the stud or pin 18 and directly into engagement with the flat face 14. The nut 19 being of less diameter than the width of the slot in the end wall 25 and of less thickness than said wall, will lie within said slot and the nut 26 can be screwed directly on to the outer end of the stud 18 and into engagement with the inner surface of the wall 25 to clamp said wall against the member 13. As shown the boss 20 is threaded and the nut 26 is screwed on to this boss instead of on to the pin 18.

As is common in bedstead construction there is provided a cross rail 30, which I rigidly secure to the member 13. It may be secured in any suitable manner as for instance by casting the end of the cross rail 30 into said member or it may be detachably connected to said member. As shown I provide a member 31 very similar to the member 12 and adapted to be rigidly secured to a flat face 32 of the member 13 which is at right angles to the flat face 14. As shown a bolt 33 is screwed into an aperture in said face 32 and serves to clamp the member 31 and the cross rail directly to said member 13. I do not wish to be limited to this particular means for attaching the side rail to the corner post as any other suitable means may be employed within the scope of my invention.

Having thus described my invention, what I claim as new and desire to protect by Letters-Patent, is:

1. In combination, a tubular bed post, a pair of co-acting clamping members, one located within the post and the other being on the outside of the post, one of said members having a pin projecting through the post and the other member having a perforation to receive said pin, a nut on the pin for drawing the members into clamping engagement with the opposite surface of the post, and a bed rail having a terminal portion through which said pin extends.

2. In combination, a tubular bed post, a pair of co-acting clamping members, one located within the post and the other being on the outside of the post, one of said members having a pin projecting through the post and the other member having a perforation to receive said pin, a bed rail having a terminal portion through which said pin extends, and two concentric nuts for holding said members and said bed rail together.

3. In combination, a tubular post, two clamping members one disposed within said post and the other outside of the post and detachably secured together and to the wall of the post, one of said members having a threaded projection thereon, a bed rail having a terminal portion perforated to receive said projection and a nut on said extension for clamping said terminal portion against the outer member.

4. In combination, a tubular bed post, a bar within said post and extending lengthwise thereof, and provided with a single threaded pin permanently secured thereto intermediate the ends thereof and adapted to project out through the wall of said post, a block in engagement with the outer surface of said post and perforated to receive said pin, a bed rail having a terminal portion perforated to receive said pin and separate concentric clamping members for holding said pin, block and terminal portion rigid in respect to each other.

5. In combination, a tubular bed post, a bar within said post and extending lengthwise thereof, and provided with a single threaded pin permanently secured thereto intermediate the ends thereof and adapted to project out through the wall of said post, a block in engagement with the outer surface of said post and perforated to receive said pin, a bed rail having a terminal portion perforated to receive said pin and separate concentrically disposed nuts for holding said pin, block and terminal portion rigid in respect to each other.

6. In combination, a tubular bed post, a member within said post and having a threaded pin rigid therewith and projecting out through the wall of the post, a member in engagement with the outer surface of said post and perforated to receive said pin and having a boss through which said pin extends, a nut on said pin and engaging with the end of the boss for holding said members together, a bed rail having a terminal portion through which said boss extends and a nut threaded on said boss for detachably holding said bed rail and second mentioned member rigid in respect to each other.

Signed at New York city in the county of New York, and State of New York, this 18th day of February, A. D. 1914.

AARON WOLF.

Witnesses:
C. W. FAIRBANK,
FLORENCE LEVIEN.

Copies of this patent may be obtained for five cents each, by addressing the "Commissioner of Patents, Washington, D. C."